July 4, 1939.   V. VALLETTA   2,164,602
MOTOR VEHICLE SUSPENSION
Filed Nov. 18, 1937   2 Sheets-Sheet 1

Inventor:
Vittorio Valetta
By: Theodore M. Jablin,
Att'y

Patented July 4, 1939

2,164,602

UNITED STATES PATENT OFFICE 2,164,602

MOTOR VEHICLE SUSPENSION

Vittorio Valletta, Turin, Italy, assignor to Fiat Società Anonima, Turin, Italy

Application November 18, 1937, Serial No. 175,221
In Italy January 30, 1937

3 Claims. (Cl. 267—19)

This invention relates to motor vehicle wheel suspensions.

Independent wheel suspensions lack the transverse stiffening afforded in ordinary suspensions by the rigid axles and the vehicle carried thereby are subject to roll, i. e. to incline excessively on one side in driving round a curve if a sufficient flexibility be maintained during concordant raising and lowering of both wheels with respect to the vehicle frame.

An attempt to obviate this drawback is the provision, in addition to the spring means for the independent suspension of the wheels, of a transverse torsion or anti-roll stabilizing bar; but this is not wholly satisfactory, the said spring means remaining unmodified, and simply resulting in increasing the number of resilient means for each wheel pair from two to three, viz., the two original springs and the transverse torsion bar. Moreover, anti-roll stabilizing of the vehicle is due both to flexibility of the bar and of the ordinary suspension springs, which is paritcularly objectionable when adjustment is required, since pitching or flexibility of both wheels moving concordantly, and rolling have opposite adjusting requirements, improvement of one being detrimental to the other.

It is an object of this invention to eliminate the above mentioned drawbacks.

A suspension according to the invention comprises a resilient means arranged to alone counteract concordant vertical displacement of the two wheels with respect to the vehicle frame but not rolling, and another resilient means interposed between the two wheels so as to alone counteract rolling of the vehicle but not concordant vertical displacement of the wheels with respect to the frame.

The second mentioned resilient means may consist of a transverse torsion bar mounted so as to be free to rotate about its own axis and connected at its ends, in a manner known per se, to the two wheels by means of levers or the like.

With a suspension according to the invention, when both wheels are raised with respect to the frame, their flexibility in millimeters of displacement per kg. of load variation, which may be represented by $F_I$, is dependent only on the first resilient means; when one wheel is raised and the other is proportionately lowered with respect to the frame rolling, the flexibility of the two wheels, which may be represented by $F_{II}$, depends upon the second resilient means only.

When one wheel only is lifted, its flexibility is dependent upon both resilient means; more particularly it will be subjected to a resistance equal to the sum of the resistance that would be afforded if both resilient means were to act simultaneously on the wheel, this, however, with a useful length and, consequently, a flexibility twice that occurring on each wheel in the first two cases. If $F_{III}$ represents the third flexibility, it can be equated thus:

$$F_{III} = \frac{1}{\frac{1}{2F_I} + \frac{1}{2F_{II}}}$$

from which it will be seen how it is also possible to increase $F_{III}$ without increasing $F_{II}$ (i. e. rolling) but only $F_I$ (i. e. the flexibility for concordant movement of both wheels).

The accompanying drawings show, by way of example, two constructions according to the invention.

Figure 1:
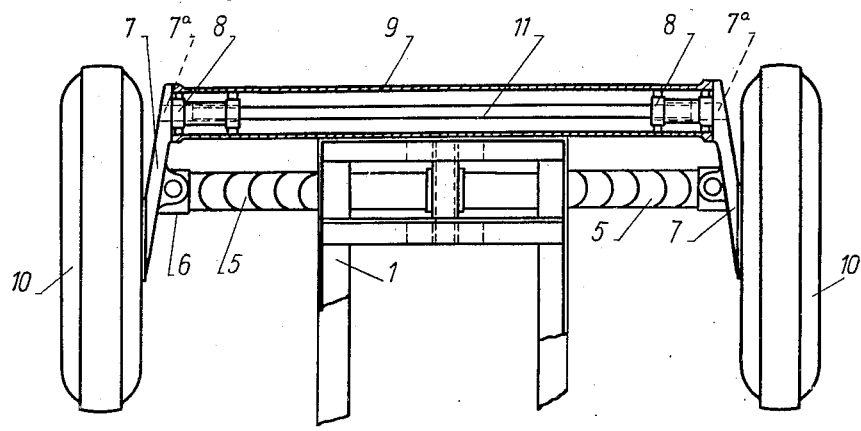
Fig. 1 is a plan, partly in section, of the first construction.
Figure 2:
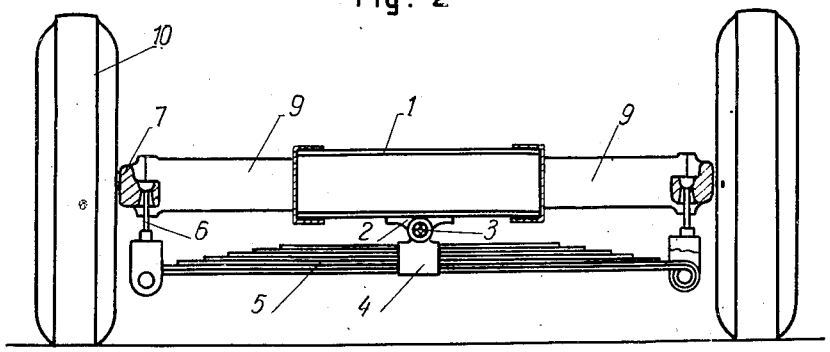
Fig. 2 is an elevation, partly in section, of the first construction.

Referring to Figs. 1 and 2, a support 2 is attached to the lower portion of the vehicle frame 1 and has articulated thereto, by means of a pivot pin 3, the stirrup 4 of a cross leaf spring 5. The ends of the leaf spring are suspended by means of members 6 from levers 7 which extend approximately in the longitudinal direction of the vehicle and which are journalled by means of pivots 7a in supports 8 arranged at the ends of a tubular member 9 secured to the frame 1. The wheels 10 are mounted at the opposite ends of the levers 7.

The two pivots 7a about which the levers 7 oscillate are connected to each other by means of a transverse torsion bar 11 which is free to turn in both supports 8.

When, for instance, the right wheel 10 is lifted and the left one is proportionately lowered with respect to the frame 1 (rolling), as occurs on taking a left-handed curve, the leaf spring 5 is not deformed but undergoes only an angular displacement about the pivot 3; the bar 11 then comes into action and undergoes torsion to give an effective stabilization. When both wheels 10 are lifted concordantly, the bar 11 performs an angular displacement over its whole length without being subjected to torsion, and in this case the leaf spring 5 counteracts the movements of the two wheels.

Figure 3:
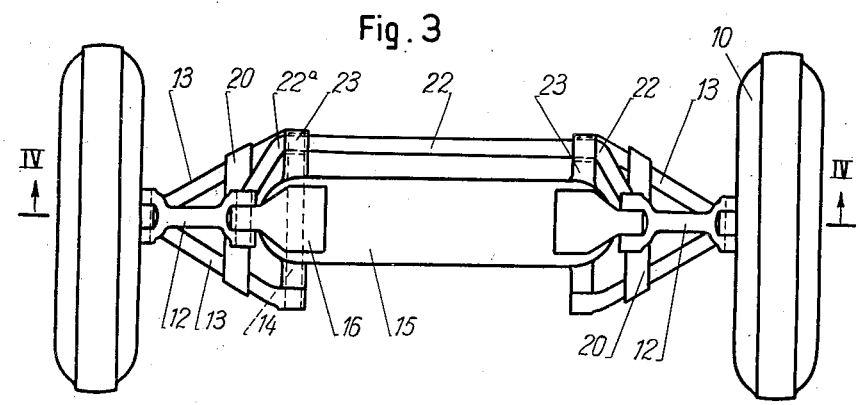
Fig. 3 is a plan of the second construction.
Figure 4:
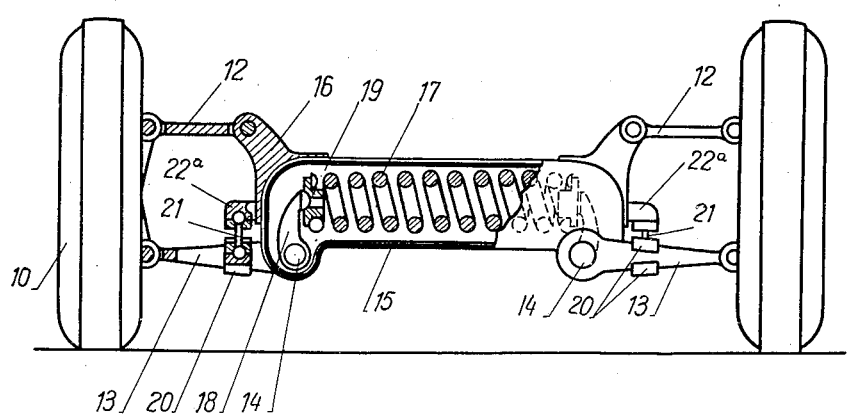
Fig. 4 is an elevation of the second construction, partly in section on the line IV—IV of Fig. 3.

Referring to Figs. 3 and 4, the two wheels 10 are connected to the frame by means of transverse articulated parallelograms comprising top links 12 and bottom links 13. The bottom links 13 are keyed to pivot pins 14 arranged in a transverse housing 15 having mounted thereon horns or supports 16 for the top links 12. Said housing 15 contains a helical spring 17 having end collars engaged by the spherical ends of levers 18 keyed one to each of the pivot pins 14.

Each bottom link 13 is provided with two bridge members 20 affording a bearing for the spherical end of a link 21 whose other spherical end is journalled in a spherical seating in an arm 22a forming part of a transverse torsion bar 22 mounted so as to be free to rotate in supports 23 fast to the housing 15.

It will be obvious that lowering of one wheel 10 accompanied by a proportionate lifting of the other wheel with respect to the frame rolling, as occurs for instance on driving round curves, does not entail a deformation of the helical spring 17 but only a displacement thereof towards the right or the left; in this case, however, the torsion bar 22 comes into action as stabilizer. On the other hand, when the two wheels 10 are raised concordantly the helical spring 17 is deformed while the torsion bar 22 does not undergo any deformation.

In both the constructions described, when only one wheel 10 is raised, this movement is absorbed by the leaf spring 5 (Figs. 1 and 2) or by the helical spring 17 (Figs. 3 and 4) together with the torsion bar 11 or 22. Nevertheless, the suspension is no stiffer than a comparable independent wheel suspension of known construction for both resilient means act over their whole length and thus afford a considerably increased flexibility.

The invention is not to be taken as limited to the constructions herein described and illustrated, which may be varied without departing from its scope.

What I claim is:

1. A motor vehicle wheel suspension comprising two resilient means for a pair of wheels, in which the first resilient means is arranged to alone counteract concordant vertical displacement of both wheels with respect to the vehicle frame, and the other resilient means is interposed between the two wheels so as to alone counteract rolling of the vehicle.

2. A suspension according to claim 1, wherein the two resilient means are arranged to operate over their whole length when only one of the two wheels is vertically displaced with respect to the vehicle frame.

3. A motor vehicle wheel suspension comprising a transverse torsion bar mounted in the vehicle frame so as to be free to turn about its own axis, an arm for either wheel attached to the end of said torsion bar and connected for oscillation with its respective wheel, a helical spring, a lever for each wheel connected with them for oscillation, both levers being arranged to act on the ends of said helical spring in opposite directions.

VITTORIO VALLETTA.